United States Patent [19]
Wang

[11] Patent Number: 5,859,955
[45] Date of Patent: Jan. 12, 1999

[54] STOCHASTICALLY CLUSTERED DOT HALFTONING SYSTEM

[75] Inventor: Shen-ge Wang, Fairport, N.Y.

[73] Assignee: Xerox Corporation, Stamford, Conn.

[21] Appl. No.: 786,470

[22] Filed: Jan. 21, 1997

[51] Int. Cl.$^6$ .................................................. H04N 1/405
[52] U.S. Cl. .......................... 395/109; 382/237; 382/270; 358/456; 358/457; 358/298
[58] Field of Search ............................. 395/109; 358/456, 358/457, 458, 454, 534, 535, 536, 533, 298, 466; 382/237, 270

[56] References Cited

U.S. PATENT DOCUMENTS

| | | | |
|---|---|---|---|
| 4,149,194 | 4/1979 | Holladay . | |
| 4,485,397 | 11/1984 | Schueter et al. . | |
| 4,595,948 | 6/1986 | Itoh et al. . | |
| 4,876,611 | 10/1989 | Fischer et al. | 358/456 |
| 5,014,123 | 5/1991 | Imoto . | |
| 5,111,194 | 5/1992 | Oneda . | |
| 5,181,162 | 1/1993 | Smith et al. . | |
| 5,341,228 | 8/1994 | Parker et al. | 358/534 |
| 5,394,252 | 2/1995 | Holladay et al. | 358/533 |
| 5,438,431 | 8/1995 | Ostromoukhov | 358/457 |
| 5,489,991 | 2/1996 | McMurray | 358/456 |
| 5,598,204 | 1/1997 | Harrington | 358/298 |
| 5,673,121 | 9/1997 | Wang | 358/456 |
| 5,740,279 | 4/1998 | Wang et al. | 382/237 |

FOREIGN PATENT DOCUMENTS

| | | |
|---|---|---|
| 0665677 | 1/1994 | European Pat. Off. . |
| 0665676 | 12/1994 | European Pat. Off. . |
| 0665675 | 12/1995 | European Pat. Off. . |

OTHER PUBLICATIONS

"Benarization Using a Two–Dimensional Pulse–Density Modulation" by R. Eschbach and R. Hauck, Journal of Optical Society of America A 4, 1873–1878(1987).

"Pulse–Density Modulation in Rastered Media: Combining Pulse–Density Modulation and Error Diffusion" by R Eschbach, Journal of Optical Society of America A, 7, 708–716 (1996).

*Primary Examiner*—Scott Rogers

[57] ABSTRACT

A method of halftoning a digitized image is described, in which a "stoclustic" screen is used. The halftone outputs produced by stochastically clustered pixel screens of the present invention (also referred to herein as "stoclustic" screens) are clustered about arbitrarily or otherwise specified centers. According to one embodiment of the present invention, one step in the present invention requires that the locations of the set of stochastically distributed black and white cluster centers must be determined. Thereafter, according to block 104, a dot or pixel growth positioning sequence for adding pixels to the cluster about the selected cluster centers must be established.

8 Claims, 5 Drawing Sheets

STOCHASTICALLY CLUSTERED DOT HALFTONING SYSTEM

The present invention relates to a digitized rendering system as may be used in color printing systems (such as in electrophotographic and ink-jet printers and copiers), and more particularly, to an apparatus and method for implementing stochastically clustered dot halftoning systems so as to improve black and white and/or color output image quality.

In the operation of a copier or printer, particularly color machines, it is highly desirable to have a means for processing and enhancing graphical, text and pictorial images. Particularly in the case of single or multi-pass color printers, it is highly desirable that an image processing system be employed to reduce imaging problems caused by rendering systems not suited to a variety of image types or the particular gray levels in those image types. While the halftoning system of the present invention is quite suitable for use on xerographic printers in which aspects of it have been tested, it may be likewise highly useful with a variety of other xerographic as well as non-xerographic printing systems such as ink-jet or other printing techniques.

In the process of digital electrostatographic printing, an electrostatic charge pattern or latent image corresponding to an original or electronic document may be produced by a raster output scanner on an insulating medium. A viewable record is then produced by developing the latent image with particles of granulated material to form a powder image thereof. Thereafter, the visible powder image is fused to the insulating medium, or transferred to a suitable support material and fused thereto. Development of the latent image is achieved by bringing a developer mix into contact therewith. Typical developer mixes generally comprise dyed or colored thermoplastic particles of granulated material known in the art as toner particles, which are mixed with carrier granules, such as ferromagnetic granules. When appropriate, toner particles are mixed with carrier granules and the toner particles are charged triboelectrically to the correct polarity. As the developer mix is brought into contact with the electrostatic latent image, the toner particles adhere thereto. Non-xerographic printing systems (such as ink-jet) may be more or less successful in printing high quality images of varying types in and may involve capabilities and/or efficiencies unlike those found in xerographic systems.

Various image rendering systems have been employed to include those set forth in the following disclosures which may be relevant to various aspects of the present invention:

U.S. Pat. No. 5,579,446

Applicant: Naik et al.

Issued: Nov. 26, 1995

U.S. Pat. No. 5,489,991

Patentee: McMurray

Issued: Feb. 6, 1996

U.S. Pat. No. 5,438,431

Patentee: Ostromoukhov

Issued: Aug. 1, 1995

U.S. Pat. No. 5,394,252

Patentee: Holladay et al.

Issued: Feb. 28, 1995

U.S. Pat. No. 5,341,228

Patentee: Parker et al.

Issued: Aug. 23, 1994

U.S. Pat. No. 5,181,162

Patentee: Smith et al.

Issued: Jan. 19, 1993

U.S. Pat. No. 5,111,194

Patentee: Oneda

Issued: May 5, 1992

U.S. Pat. No. 5,014,123

Patentee: Imoto

Issued: May 7, 1991

U.S. Pat. No. 4,595,948

Patentee: Itoh et al.

Issued: Jun. 17, 1986

U.S. Pat. No. 4,485,397

Patentee: Schueter et al.

Issued: Nov. 27, 1984

U.S. Pat. No. 4,876,611

Patentee: Fischer et al.

Issued: Oct. 24, 1989

U.S. Pat. No. 4,149,194

Patentee: Holladay

Issued: Apr. 10, 1979

EPO App.: 0665676

Applicant: Winter et al.

Priority Date: Dec. 27, 1994

EPO App.: 0665677

Applicant: Winter et al.

Priority Date: Jan. 27, 1994

"Binarization Using a Two-Dimensional Pulse-Density Modulation", by R. Eschbach and R. Hauck, Journal of the Optical Society of America A, 4, 1873–1878 (1987)

"Pulse-Density Modulation on Rastered Media: Combining Pulse-Density Modulation and Error Diffusion", by R. Eschbach, Journal of the Optical Society of America A, 7, 708–716(1990)

U.S. Pat. No. 5,579,446 discloses a color printer system including an interactive user interface that allows a choice between one "button" automatic control of color output or multibutton control of color output, with both automatic and manual options providing independent control for color halftoning and for color correction based on the types of objects to be printed. The preferred form allows independent print-rendering options for text, graphics and photo image.

U.S. Pat. No. 5,489,991 to McMurray discloses a method for generating digital halftone matrices of a selected size for use in an image processing system in which bi-level images are formed from continuous tone input images using the digital halftone matrices. In accordance with the method, a two-dimensional array of storage positions is defined for storing values. The two-dimensional array is divided into four quadrants of equal size, each quadrant having a quadrant origin, a quadrant perimeter and four subquadrants disposed around the quadrant origin.

U.S. Pat. No. 5,438,431 to Ostromoukhov discloses a method and apparatus for enabling color or black/white bi-level or multi-level halftone images to be displayed or printed on various raster output devices, in particular on display or printing devices. A dither matrix $R^{c2n}$ is obtained by applying on a c-fold replication of a well-dispersed threshold matrix $D^n$ a one-to-one discrete rotation of Pythagorean angle $a=\arctan(b/a)$ or $\beta=\arctan(a/b)$ around an arbitrary point, where $\{a,b,c\}$ are Pythagorean triplets satisfying Diophantine equation $a^2+b^2=c^2$ and n is an integer. The images produced using the disclosed method are visually pleasing due to the absence of visible artifacts and to the small typical structure size.

U.S. Pat. No. 5,394,252 to Holladay et al. (and others) teach of the advantages of stochastic or non-periodic screening over periodic screening in the suppression of moiré effects.

U.S. Pat. No. 5,341,228 to Parker et al. discloses a halftoning system using a stochastic process known as a blue noise mask. Briefly, the procedure can be described as follows: 1) Starting at one gray level with a chosen dot pattern, or "seed", the process iteratively uses a Fast Fourier Transform (FFT) techniques with a "blue noise" filter to redistribute all spots in dot pattern and eliminate large visual "clumps"; 2) Next, the dot pattern is processed at the next gray level by increasing (or decreasing) certain number of black spots on the previously determined dot pattern. Existing black (or white) spots are not moved. The same filtering technique is used to distribute newly added (or subtracted) dots; 3) Step 2 is then repeated for all gray levels sequentially. At each step, the width of the blue-noise filter varies by an amount corresponding to the current gray level; 4). The summation of dot patterns for each gray levels is the blue noise mask generated. The mask is then used to generate a halftone screen. The result of described sequential design procedure strongly depends on the choice of the seed pattern. If the output is not a satisfactory one, the design procedure has to start over again by choosing different seed or changing the blue noise filter. Since the threshold value of each pixel of the dithering screen is fixed at the gray level when the corresponding dot is added (or eliminated), the freedom to locate undetermined pixels is getting smaller and smaller while the design sequence is approaching the end. These constraints limit further improvement of the image quality generated by blue noise masks.

U.S. Pat. No. 5,181,162 discloses an object-oriented document management and production system in which documents are represented as collections of logical components, or "objects", that may be combined and physically mapped onto a page-by-page page layout. Stored objects are organized, accessed and manipulated through a database management system. At a minimum, objects contain basic information-bearing constituents such as text, image, voice or graphics. Objects may also contain further data specifying appearance characteristics, relationships to other objects and access restrictions. U.S. Pat. No. 5,111,194 to Oneda discloses artificial halftone processing apparatus for binarizing input image information on the basis of the densities of pixels and combining a plurality of sets of resultant binary data to produce multi-level tone information. A matrix for halftone processing is variable in size or arrangement to store a plurality of pixel data in a memory.

U.S. Pat. No. 4,595,948 to Itoh et al. discloses superposing individual dot matrices of at least two colors. A computing unit receives electrical input signals representing the image and generates and feeds corresponding electrical signal representing the individual matrices of the at least two colors to the head means for printing. The computing means includes matrix generator means for generating the matrices in such a manner that the total number of dots to be printed in all of the matrices is limited to a first predetermined value which is less than the maximum possible total number of dots which can be printed in all of said individual dot matrices, and the total number of dots to be printed in the matrices which are formed by superposed dots of different colors is limited to a second predetermined value which is less than said first predetermined value. U.S. Pat. No. 4,485,397 to Scheuter et al. describes a method for generating a non-periodic halftone distribution by determining areas of constant or nearly constant input density and by distributing a precalculated number of print dots inside each area based on a random or pseudo random number and some spatial constraints.

U.S. Pat. No. 4,876,611 to Fischer et al. describes another stochastic screening algorithm in which the print/no-print decision is based on a recursive subdivision of the print field maintaining average density over the larger print field.

U.S. Pat. No. 4,149,194 to Holladay discloses an electronic signal representing the density of a scanned image electronically halftoned by combining the pictorial signal with a rectangular array of halftone screen values to form an electronic halftone image. The halftone screen values is rotated at variable angles to the original electronic image by defining a repetitive rectangular matrix representative of any predetermined halftone cell approximating a parallelogram and incorporating a shifting parameter for the repetitive rectangular matrix.

EPO Application No. 0665676 discloses a method of using a printer system for identifying one or more different types of color objects in a document, selecting a preferred rendering option such as halftoning and/or color matching for each one of such different color object type, and then printing the document in accordance with the rendering options selected for each of such different color object types. Blocks 54 are provided for the identification of the object type of document objects. A print driver flags the object with their types at block 54. In a printing system such as an ink-jet color printer coupled through a printer driver to a host computer, a default halftoning technique and a default color-matching map are incorporated into the printer system for automatic invocation whenever a particular color object type (41043) is printed.

EPO Application No. 0665677 discloses the use of different print-quality modes in a printer, such as a color ink-jet printer, invoke different color-rendering options for a particular object to be printed—in a composite document having objects of different types. In an exemplary embodiment, a printer control automatically invokes an error-diffusion halftoning technique for photograph-like images whenever a high-quality print mode is designated, and automatically invokes a dither halftoning technique for photograph-like images whenever a normal or fast print mode is designated.

A non-periodic halftoning scheme based on a pulse-density modulation is taught in "Binarization using a two-dimensional pulse-density modulation", by R. Eschbach and R. Hauck, Journal of the Optical Society of America A, 4, 1873–1878(1987); and "Pulse-density modulation on rastered media: combining pulse-density modulation and error diffusion", by R. Eschbach, Journal of the Optical Society of America A, 7, 708–716 (1990). In pulse-density modulation a mathematical model is used that guarantees the local density of print pulses as a function of the input image data.

In accordance with one aspect of the present invention, there is provided a method of designing a digital halftoning screen for forming images on output sheets according to a set of image signals, the method including the steps of: selecting a first set of stochastically distributed black cluster centers; selecting a second set of stochastically distributed white cluster centers; and growing pixels about the black cluster centers and the white cluster centers according to a pixel filling optimization system.

In accordance with another aspect of the present invention, there is provided a printing system including a system for digitally halftoning images on an output sheet according to a set of image signals. The printing system includes: a memory for storing a stochastically clustered halftone screen including a first set of stochastically distributed black cluster centers and a second set of stochastically distributed white cluster centers, wherein sets of pixels are filled about the black cluster centeres and the white cluster centers according to a pixel filling optimization system; and a processor for comparing the image signals to said halftone screen for providing a rendered image on said output sheet.

Other features of the present invention will become apparent as the following description proceeds and upon reference to the drawings, in which:

While the present invention will hereinafter be described in connection with preferred embodiments thereof, it will be understood that it is not intended to limit the invention to these embodiments. On the contrary, it is intended to cover all alternatives, modifications and equivalents, as may be included within the spirit and scope of the invention as defined by the appended claims.

Figure 5:
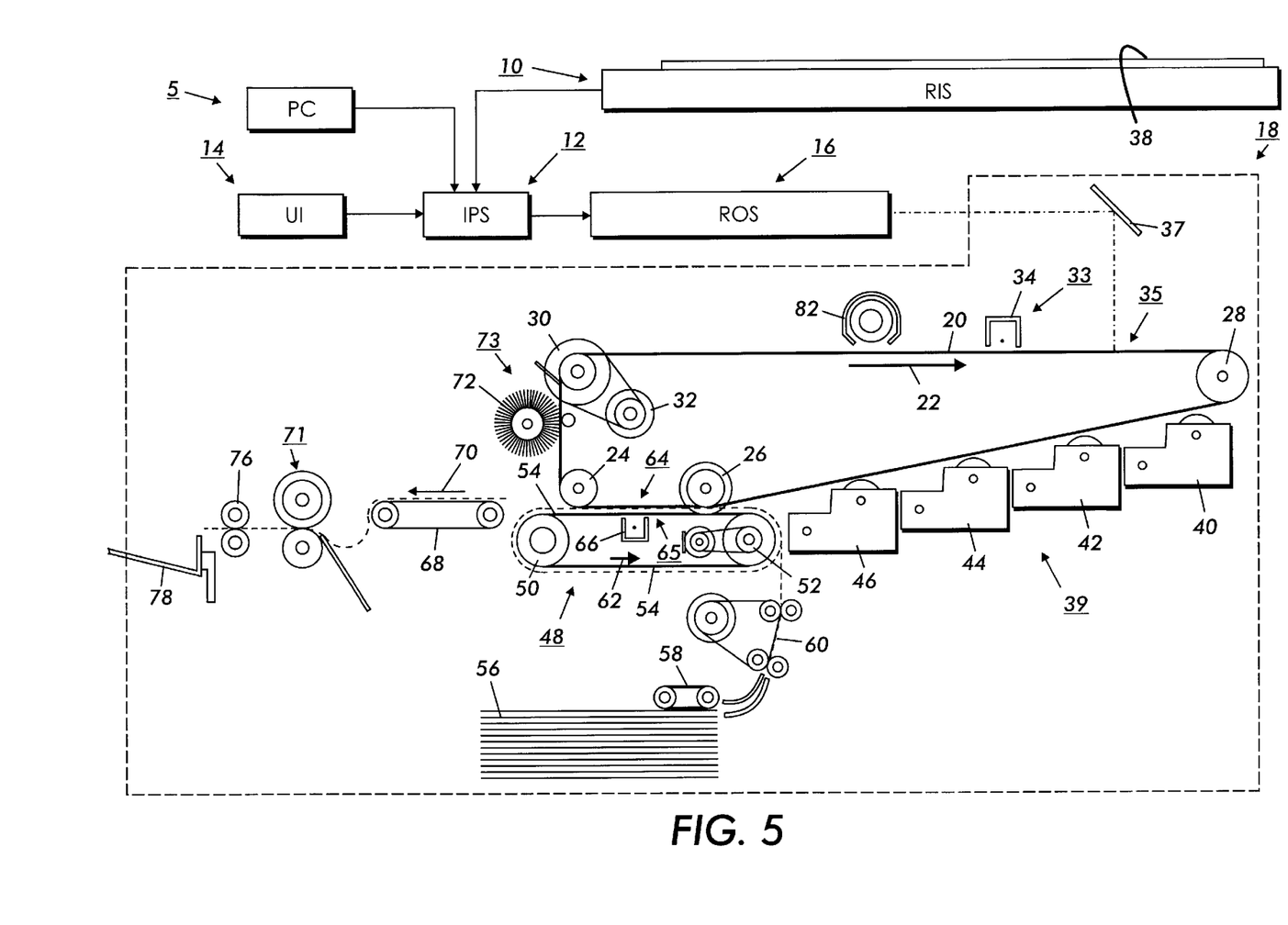
FIG. 5 is a schematic elevational view showing an exemplary color xerographic printing/copying machine and networked PC incorporating features of the present invention therein.

For a general understanding of the features of the present invention, reference is made to the drawings. FIG. 5 is a schematic elevational view showing an exemplary electrophotographic printing/copying machine and a networked PC which may incorporate features of the present invention therein. It will become evident from the following discussion that the system of the present invention is equally well suited for use in a wide variety of printing and copying systems, and therefore is not limited in application to the particular system(s) shown and described herein. An ESS (electronic subsystem) or image processing station (both referred to as IPS), indicated generally by the reference numeral 12, contains data processing and control electronics which prepare and manage the image data flow to a raster output scanner (ROS), indicated generally by the reference numeral 16. A network of one or more personal computers (PC), indicated generally by the reference numeral 5, is shown interfacing/in communication with IPS 12. A user interface (UI), indicated generally by the reference numeral 14, is also in communication with IPS 12.

UI 14 enables an operator to control and monitor various operator adjustable functions and maintenance activities. The operator actuates the appropriate keys of UI 14 to adjust the parameters of the copy. UI 14 may be a touch screen, or any other suitable control panel, providing an operator interface with the system. The output signal from UI 14 is transmitted to IPS 12. UI 14 may also display electronic documents on a display screen (not shown in FIG. 5), as well as carry out the image rendering selections in accordance with the present invention as described in association with FIGS. 1 through 4 below.

As further shown in FIG. 5, a multiple color original document 38 may be positioned on (optional) raster input scanner (RIS), indicated generally by the reference numeral 10. The RIS contains document illumination lamps, optics, a mechanical scanning drive, and a charge coupled device (CCD array) or full width color scanning array. RIS 10 captures the entire image from original document 38 and converts it to a series of raster scan lines and moreover measures a set of primary color densities, i.e., red, green and blue densities, at each point of the original document. RIS 10 may provide data on the scanned image to IPS 12, indirectly to PC 5 and/or directly to PC 5.

Documents in digital or other forms may be created, screened, modified, stored and/or otherwise processed by PC 5 prior to transmission/relay to IPS 12 for printing on printer 18. The display of PC 5 may show electronic documents on a screen (not shown in FIG. 5). IPS 12 may include the processor(s) and controller(s) (not shown in FIG. 5) required to perform the adaptive image rendering system of the present invention.

IPS 12 also may transmit signals corresponding to the desired electronic or scanned image to ROS 16, which creates the output copy image. ROS 16 includes a laser with rotating polygon mirror blocks. The ROS illuminates, via mirror 37, the charged portion of a photoconductive belt 20 of a printer or marking engine, indicated generally by the reference numeral 18, at a rate of about 400 pixels per inch, to achieve a set of subtractive primary latent images. (Other implementations may include other pixel resolutions of varying types 600×600 dpi, or even asymmetrical resolutions, such as 300×1200 dpi, both configurations of which are employed in versions of the Xerox 4900 printer family.) The ROS will expose the photoconductive belt to record three or four latent images which correspond to the signals transmitted from IPS 12. One latent image is developed with cyan developer material. Another latent image is developed with magenta developer material and the third latent image is developed with yellow developer material. A black latent image may be developed in lieu of or in addition to other (colored) latent images. These developed images are transferred to a copy sheet in superimposed registration with one another to form a multicolored image on the copy sheet. This multicolored image is then fused to the copy sheet forming a color copy.

With continued reference to FIG. 5, printer or marking engine 18 is an electrophotographic printing machine. Photoconductive belt 20 of marking engine 18 is preferably made from a photoconductive material. The photoconductive belt moves in the direction of arrow 22 to advance successive portions of the photoconductive surface sequentially through the various processing stations disposed about the path of movement thereof. Photoconductive belt 20 is entrained about rollers 23 and 26, tensioning roller 28, and drive roller 30. Drive roller 30 is rotated by a motor 32 coupled thereto by suitable means such as a belt drive. As roller 30 rotates, it advances belt 20 in the direction of arrow 22.

Initially, a portion of photoconductive belt 20 passes through a charging station, indicated generally by the reference numeral 33. At charging station 33, a corona generating device 34 charges photoconductive belt 20 to a relatively high, substantially uniform potential.

Next, the charged photoconductive surface is rotated to an exposure station, indicated generally by the reference numeral 35. Exposure station 35 receives a modulated light beam corresponding to information derived by RIS 10 having multicolored original document 38 positioned thereat. The modulated light beam impinges on the surface of photoconductive belt 20. The beam illuminates the charged portion of the photoconductive belt to form an electrostatic latent image. The photoconductive belt is exposed three or four times to record three or four latent images thereon.

After the electrostatic latent images have been recorded on photoconductive belt 20, the belt advances such latent images to a development station, indicated generally by the reference numeral 39. The development station includes four individual developer units indicated by reference numerals 40, 42, 44 and 46. The developer units are of a type generally referred to in the art as "magnetic brush development units." Typically, a magnetic brush development system employs a magnetizable developer material including magnetic carrier granules having toner particles adhering triboelectrically thereto. The developer material is continually brought through a directional flux field to form a brush of developer material. The developer material is constantly moving so as to continually provide the brush with fresh developer material. Development is achieved by bringing the brush of developer material into contact with the photoconductive surface. Developer units 40, 42, and 44, respectively, apply toner particles of a specific color which corresponds to the complement of the specific color separated electrostatic latent image recorded on the photoconductive surface.

The color of each of the toner particles is adapted to absorb light within a preselected spectral region of the electromagnetic wave spectrum. For example, an electrostatic latent image formed by discharging the portions of charge on the photoconductive belt corresponding to the green regions of the original document will record the red and blue portions as areas of relatively high charge density on photoconductive belt 20, while the green areas will be reduced to a voltage level ineffective for development. The charged areas are then made visible by having developer unit 40 apply green absorbing (magenta) toner particles onto the electrostatic latent image recorded on photoconductive belt 20. Similarly, a blue separation is developed by developer unit 42 with blue absorbing (yellow) toner particles, while the red separation is developed by developer unit 44 with red absorbing (cyan) toner particles. Developer unit 46 contains black toner particles and may be used to develop the electrostatic latent image formed from a black and white original document. Each of the developer units is moved into and out of an operative position. In the operative position, the magnetic brush is substantially adjacent the photoconductive belt, while in the nonoperative position, the magnetic brush is spaced therefrom. During development of each electrostatic latent image, only one developer unit is in the operative position, the remaining developer units are in the nonoperative position.

After development, the toner image is moved to a transfer station, indicated generally by the reference numeral 65. Transfer station 65 includes a transfer zone, generally indicated by reference numeral 64. In transfer zone 64, the toner image is transferred to a sheet of support material, such as plain paper amongst others. At transfer station 65, a sheet transport apparatus, indicated generally by the reference numeral 48, moves the sheet into contact with photoconductive belt 20. Sheet transport 48 has a pair of spaced belts 54 entrained about a pair of substantially cylindrical rollers 50 and 53. A sheet gripper (not shown in FIG. 5) extends between belts 54 and moves in unison therewith. A sheet 25 is advanced from a stack of sheets 56 disposed on a tray. A friction retard feeder 58 advances the uppermost sheet from stack 56 onto a pre-transfer transport 60. Transport 60 advances the sheet (not shown in FIG. 5) to sheet transport 48. The sheet is advanced by transport 60 in synchronism with the movement of the sheet gripper. The sheet gripper then closes securing the sheet thereto for movement therewith in a recirculating path. The leading edge of the sheet (again, not shown in FIG. 5) is secured releasably by the sheet gripper. As belts 54 move in the direction of arrow 62, the sheet moves into contact with the photoconductive belt, in synchronism with the toner image developed thereon. In transfer zone 64, a corona generating device 66 sprays ions onto the backside of the sheet so as to charge the sheet to the proper magnitude and polarity for attracting the toner image from photoconductive belt 20 thereto. The sheet remains secured to the sheet gripper so as to move in a recirculating path for three cycles. In this way, three or four different color toner images are transferred to the sheet in superimposed registration with one another.

One skilled in the art will appreciate that the sheet may move in a recirculating path for four cycles when under color black removal is used. Each of the electrostatic latent images recorded on the photoconductive surface is developed with the appropriately colored toner and transferred, in superimposed registration with one another, to the sheet to form the multicolored copy of the colored original document. After the last transfer operation, the sheet transport system directs the sheet to a vacuum conveyor 68. Vacuum conveyor 68 transports the sheet, in the direction of arrow 70, to a fusing station, indicated generally by the reference numeral 71, where the transferred toner image is permanently fused to the sheet. Thereafter, the sheet is advanced by a pair of rolls 76 to a catch tray 78 for subsequent removal therefrom by the machine operator.

The final processing station in the direction of movement of belt 20, as indicated by arrow 22, is a photoreceptor cleaning apparatus, indicated generally by the reference numeral 73. A rotatably mounted fibrous brush 72 may be positioned in the cleaning station and maintained in contact with photoconductive belt 20 to remove residual toner particles remaining after the transfer operation. Thereafter, lamp 82 illuminates photoconductive belt 20 to remove any residual charge remaining thereon prior to the start of the next successive cycle. As mentioned above, other xerographic and non-xerographic printer hardware implementations may be used with the color or black and white halftoning systems of the present invention.

In conjunction with FIGS. 1 through 4, the present invention will be generally be described in terms of its application to a printer or copier such as described above in association with FIG. 5.

Figure 1:
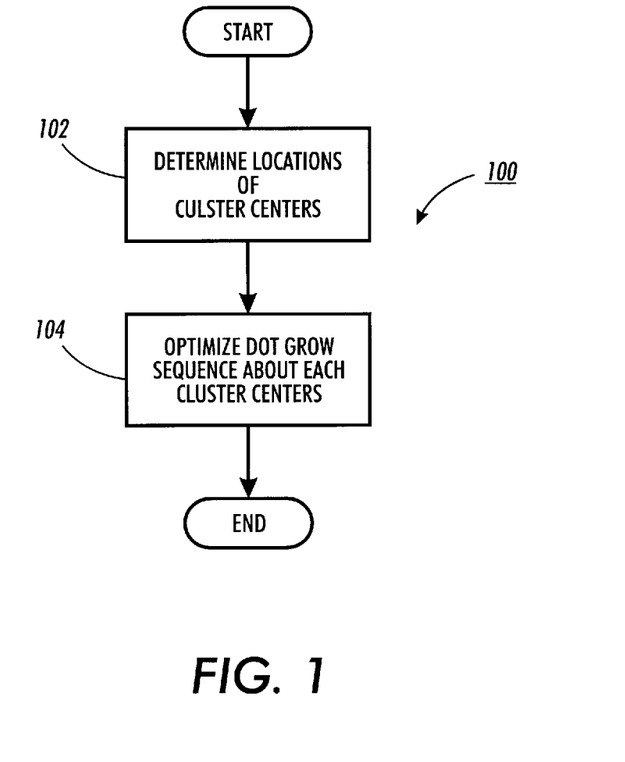
FIG. 1 is a flow chart of a generalized embodiment of the of a stochastic clustering system of the present invention.

FIG. 1 shows a generalized flow chart for the present invention in which includes a system for digitally rendering black and white or colored halftone images using a stochastically clustered dot or "stoclustic" screen. This stoclustic screen includes a system whereby the centers or centroids of clusters of pixels are stochastically distributed. The halftone screens of the present invention combine features from both clustered and stochastic halftone dots, while providing improved color rendering stability and enhanced (more) gray levels in certain embodiments. In its fundamental form, the procedure used to design the stoclustic screens of the present invention generally include the steps of (a) determining the locations of the set of stochastically distributed cluster centers; and (b) establishing a dot growth positioning sequence for adding pixels to the cluster about the selected cluster centers. In one desirable embodiment, these two steps can be achieved by using automatic halftone design methods according to U.S. Pat. No. 5,673,121 entitled "Stochastic Halftoning Screening Method" and U.S. Pat. No. 5,787,238 entitled "Clustered Halftone Dot Design Process", both assigned to Xerox Corporation and incorporated herein by reference. These applications describe methods for designing, respectively, stochastic screens and clustered halftone screens. It has been determined that "pure" stochastic screens may provide more gray levels but less color stability than other types of screens; at the same time, it has also been determined that clustered dots are more color stable, yet have fewer gray levels (and may also suffer from Moiré patterns or interference). As such, the present invention effectively combines these two types of halftone screens to overcome the problems that may be encountered when one system or the other is used alone.

The halftone outputs by stochastically clustered pixel screens (also referred to herein as "stoclustic" screens) are clustered about arbitrarily or otherwise specified centers. According to one embodiment of the present invention, one step in the present invention requires that the locations of the set of stochastically distributed cluster centers must be determined. (Block 102 of FIG. 1.) Thereafter, according to block 104, a dot growth positioning sequence for adding pixels to the cluster about the selected cluster centers must be established. The details on certain of the various embodiments of these steps of the present invention are described later below.

Figure 2:
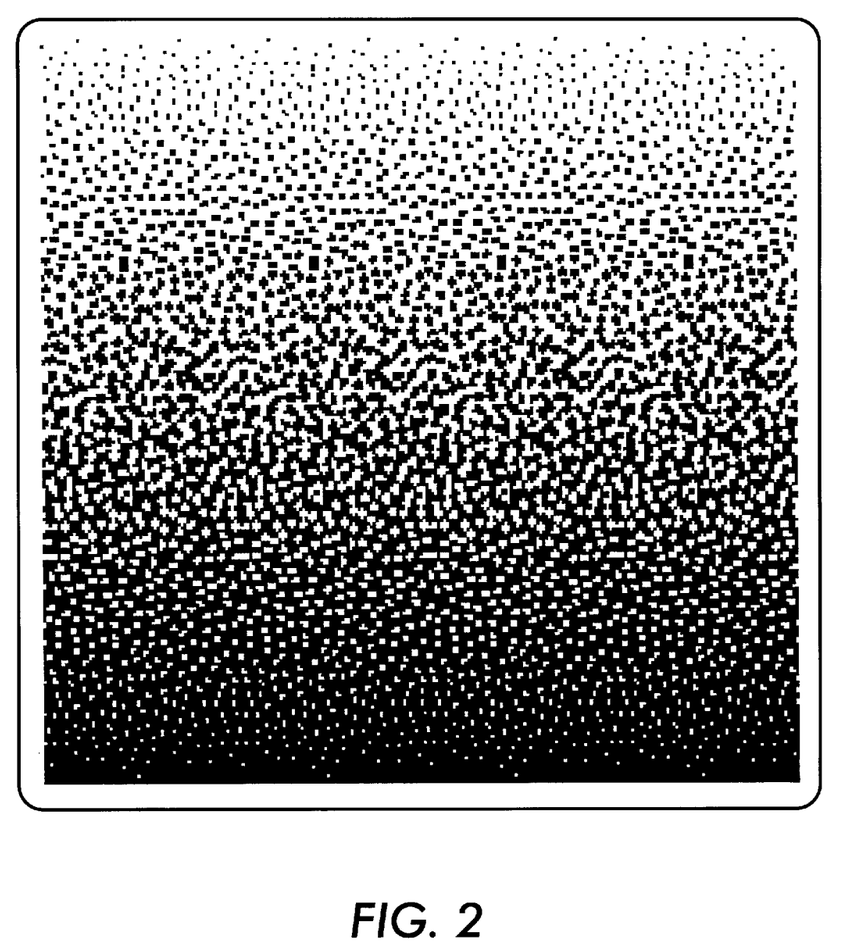
FIG. 2 is an image area rendered according to one embodiment of the present invention.

FIG. 2 shows an exemplary halftone sweep generated by a stoclustic screen with 64-by-64 pixels in 400 stochastically distributed clusters, 200 in white and 200 in black. It may be noted that the black pixels in the highlight region and the white pixels in the shadow region of the FIG. 2 sweep are distributed in the same way as an output by a "pure" stochastic screen. In this manner, these isolated single pixels are specified cluster centers, while it will be noted that the remaining pixels have an induced tendency to grow about these established cluster centers. While the following discussion will concentrate on the design of such "stoclustic" screens, the method of the present invention may also be also used to design clustered pixel screens having a fixed line frequency.

Figure 3:
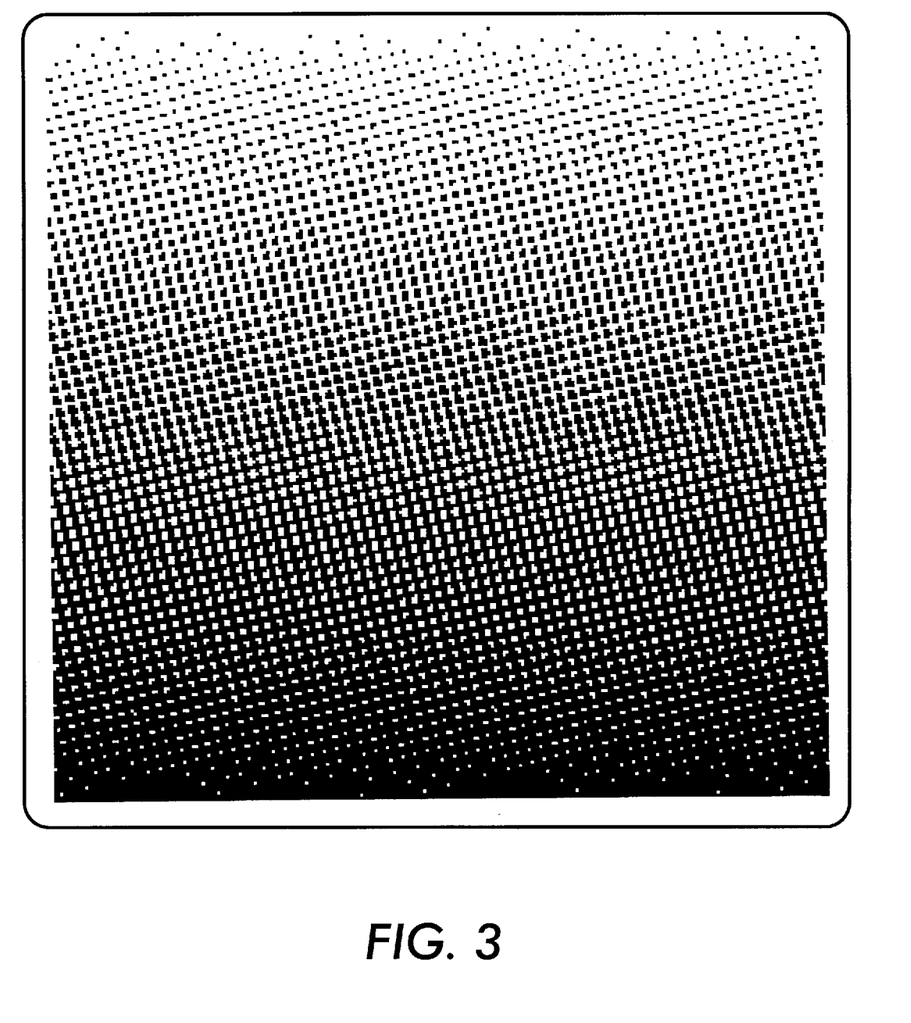
FIG. 3 is an image area rendered according to another embodiment of the present invention.

FIG. 3 shows a halftone sweep created by a stoclustic screen that includes 119-by-119 pixels in 833 white and 833 black clusters. The centers of all clusters are aligned with an orthogonal coordinate tilted at 14 degrees. In that the locations of the cluster centers can be specified in floating-point numbers and the optimization process will find the "best" choice for all pixels, halftone screens with arbitrary tilt angles and/or arbitrary frequencies, as well as arbitrary shapes, such as hexagonal dots, can be also designed according to the method of the present invention.

Returning to a detailed description of the block 102 step of the FIG. 1, the relative locations of the cluster centers must first be determined. While the selected number of clusters and locations of these clusters can be varied (such as by an arbitrary or design objective-driven choice), these selections must support the cluster dot size limit of the final designed screen. In order to achieve the desired high quality "smooth" image output, the selected number of clusters should be desirably matched with the desired clusters size. This matching will allow for optimized uniform distribution of the dots about their cluster centers.

The use of floating-point numbers allows many methods to be applied to stoclustic screen design. In this manner, "N" (cluster center) points are "uniformly" distributed within the screen area, subject to the periodicity constraints that might otherwise result in an undesirable halftoning system. For that matter, even a unsophisticated (if not manual) cluster center placement selection system for "m" locations can provide practical and effective alternatives. (The practicality of selecting cluster dot center locations in an unsophisticated manner does not extend to surrounding dot fill-in order, as will be discussed later.)

In a first example, (the output result of which is shown in FIG. 2), the locations of white dots and black dots are determined by a "pure" stochastic screen with 128×128 pixels. A binary halftone output with 128×128 pixels is created by the stochastic screen at a constant input level, where the output pattern contains exactly 200 black pixels. The binary output pattern is then scaled to match the desired size (64×64) of the stoclustic screen and use the locations of 200 black pixels as the centers for 200 black clusters. Thereafter, the same stochastic screen is then used to create another binary pattern with 400 black pixels. All previously used 200 black pixels are included in the new pattern, due to the basic feature of thresholding and other 200 black pixels are expected to fill "evenly" in the space left by the first group of 200 black centers. Therefore, the second group is a proper choice of the centers for white clusters in the stoclustic screen.

While the above-described stochastic screen is one design option, a screen could be designed to achieve the same purposes according to the following optimization criteria:

(a) Use the same basic criteria as is used to design "pure" stochastic screens, but construct only as required for the lowest m levels (1 to m) and the highest m levels (N−1 to N−m), wherein again, N is the size of the stochastic screens and m is the desired number of locations; and (b) Minimize the sum: $\Sigma 1/d^2(P_{low}, P_{high})$, wherein $d(P_{low}, P_{high})$ is the distance between one pixel from the low-end group (1 to m) and another pixel from the high-end group (N−1 to N−m). The resulting summation can thus be used to cover all possible combinations in constructing a complete screen.

These design criteria may be further tested by redesigning this stoclustic screen using a modified stochastic screen design program. As will be noted, an improved halftoned output can be achieved according to greater optimization of criterion (b) above.

In a second exemplary implementation (an output result of which is shown in FIG. 3) a screen with 119×119 pixels is generated. (A portion of this screen is representatively indicated by grid 400 of FIG. 4.) The centers of the resultant 833 white clusters are specified by the hollow white circles, which has 4.123 spacing in both dimensions and tilted at 14 degrees. The centers of the resultant 833 black clusters are specified by the solid black circles, which are roughly speaking, interposed between the hollow white circles. Again according to applicable periodicity requirement constraints, the black cluster spacing specification yields spacing equal to 4.123.

According to block 104 of FIG. 1, the pixel growth sequence about each cluster center must also be optimized in constructing the screen. Once the center locations of all black and white clusters are specified, for each pixel of the stoclustic screen, the closest white cluster center and the closest black dot cluster center can be identified.

Figure 4:
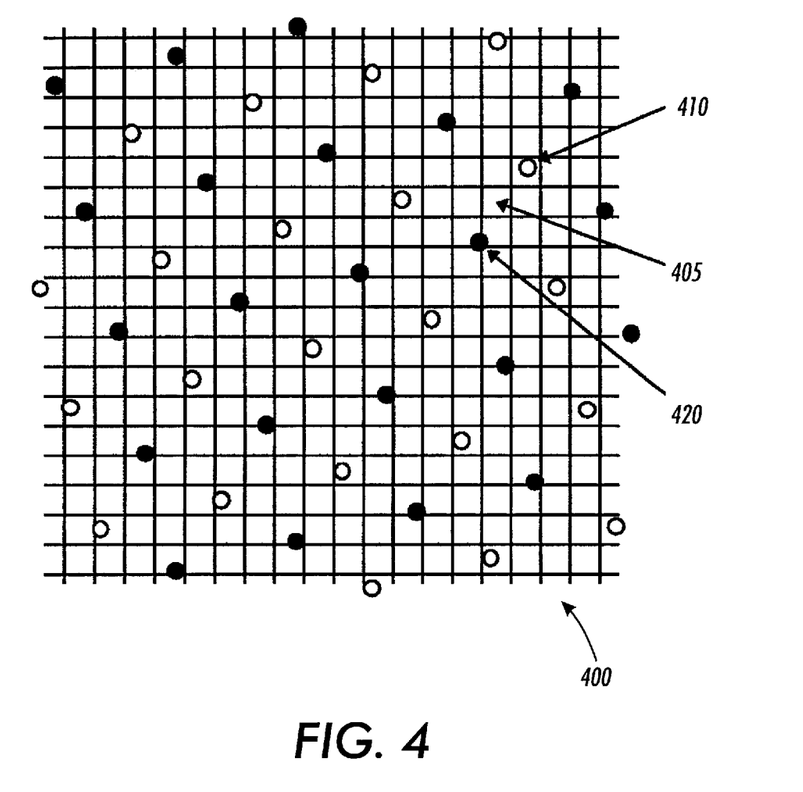
FIG. 4 is an exemplary dot profile diagram of a stochastic clustering system of the present invention.

Again, FIG. 4 shows a representative portion of a stoclustic screen of the present invention such as may be used to create the FIG. 3 halftone sweep. The white circles of FIG. 4 are the representative centers of clusters of white dots, while the solid black circles of FIG. 4 are the representative centers of black dot clusters. In the FIG. 4 representative example, a pixel 405 (having a grid address p (i, j, shown as a "p" in FIG. 4)) has its nearest white center $C_{white}(k)$ at element 410 and the nearest black center $C_{black}(h)$ at element 420. In this manner, all pixels can be divided into $m_{white}$ groups based upon the index of their nearest white center k, k=1, ..., $m_{white}$, where $m_{white}$ is the total number of white centers. Alternatively, all pixels can be divided into other $m_{black}$ groups based upon the nearest black center h, h=1, ..., $m_{black}$.

At each input level g, if g is below 50% of the gray scale range, the optimization processes the white clusters; if the input level g, if g is above 50% of the gray scale range, the optimization processes the black clusters. For each cluster, the centroid of this cluster at this level can be calculated according to the function:

$$x_o(g,k) = \Sigma x/n(g,k), \; y_o(g,k) = \Sigma y/n(g,k),$$

wherein:

k is the index of the group;

n(g,k) is the total number of pixels shown as white (or black) in this group at this level; and x, y are the x- and y-direction pixel coordinates.

The moment of inertia at this particular gray level is defined by the function:

$$m(g,k) = \Sigma [x - x_o(g,k)]^2 + [y - y_o(g,k)]^2,$$

wherein in addition to the definitions of the previous function, $\Sigma$ is over all white (or black) pixels shown at this level in the specified group.

In executing the optimization process, such as described in application Ser. No. 08/749,306 assigned to Xerox, and incorporated herein by reference, determination of the "penalty functions" $Q_m$, is performed according to the function:

$$Q_m = \sum_{\text{all } g} \sum_{\text{all } k} m(g, k),$$

This function effectively requires that all pixels are grouped into clusters in the same size and same shape at each level.

The penalty function $Q_d$ (also as described in application Ser. No. 08/749,306, and incorporated specifically herein by reference) is determined according to the following function:

$$Q_d = \sum_{\text{all } g} \sum_{\text{all } k_1, k_2} 1/\{[x_o(g, k_1) - x_o(g, k_2)]^2 + [y_o(g, k_1) - y_o(g, k_2)]^2\},$$

The above function thereby requires that all clusters are separated according to maximal (optimized) distances. In this manner, the $Q_m$ and $Q_d$ functions may be used optimize the stoclustic screen of the present invention according to the aforementioned and/or incorporated swapping processes.

More specifically, FIG. 3 of U.S. application Ser. No. 08/749,306 is one example of a system that could employ in relevant part according to the present invention. For example, rather than selecting a pattern for the screen as shown and described in block/step 100 of Ser. No. 08/749,306, the present invention could provide instead of that step for the selection of black and white cluster centers for the screen. Thereafter, the steps for optimally growing pixels about those cluster centers can be performed according to the remaining steps shown and described in association with FIG. 3 in application Ser. No. 08/749,306.

Accordingly, the present invention provides a method to design a family of "stoclustic" halftone screens that combines the advantages of both cluster halftone and stochastic halftone. The halftone screen generated by according to the system of the present invention supports sufficient gray-levels for sweeps at acceptable screen frequency, while at the same time maintain the desired rendering stability. The screens of the present invention may be used with selected image types, or with certain (or all) color separations. In particular, the screen of the present invention is useful to eliminate moiré patterns as well as to provide for a more stable imaging platform (that is, a process that will be less prone to resulting in undesirable or lower quality halftoned image outputs such as may occur in xerographic or other types of print engines).

While the present invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

I claim:

1. A method of designing a digital halftoning screen for forming images on output sheets according to a set of image signals, said method including the steps:

selecting a first set of stochastically distributed black cluster centers;

selecting a second set of stochastically distributed white cluster centers; and growing pixels about the black cluster centers and the white cluster centers according to a pixel filling optimization system.

2. The method of claim 1, wherein the first set of black cluster centers is the same size as the second set of white cluster centers.

3. The method of claim 1, wherein the first set size is at least 200 and the second set size is at least 200.

4. The method of claim 1, wherein the first set size is 833 and the second set size is 833; and wherein each cluster size is 119 pixels by 119 pixels.

5. The method of claim 1 wherein the pixel filling optimization system includes the steps:

a) randomly selecting a set of pixels to be optimized;

b) calculating at least one initial penalty associated with an original threshold;

c) swapping selected random pixels from said original threshold;

d) calculating at least one swapped penalty associated with the swapped pixels;

e) retaining the swapped pixels in the screen only when the at least one penalty for the swapped pixels is lower than the at least one penalty for the original; and f) repeating steps a) through e) for a predetermined set of iterations.

6. The method of claim 1, wherein said halftoning screen is used to halftone at least one color separation of a multi-colored digitized image.

7. The method of claim 1, wherein said halftoning screen is selectively used to halftone at least one of a plurality of selected image types.

8. A printing system including a system for digitally halftoning images on an output sheet according to a set of image signals, said printing system comprising;

a memory for storing a stochastically clustered halftone screen including a first set of stochastically distributed black cluster centers and a second set of stochastically distributed white cluster centers, wherein sets of pixels are filled about the black cluster centeres and the white cluster centers according to a pixel filling optimization system; and a processor for comparing said image signals to said halftone screen for providing a rendered image on said output sheet.

* * * * *